United States Patent [19]
Hopf

[11] 3,825,099
[45] July 23, 1974

[54] LUBRICATING SYSTEM FOR AXLE GEAR

[75] Inventor: Wilhelm Hopf, Stuttgart, Germany

[73] Assignee: Daimler-Benz Aktiengesellschaft, Stuttgart, Germany

[22] Filed: Oct. 12, 1972

[21] Appl. No.: 296,874

[30] Foreign Application Priority Data
Oct. 12, 1971   Germany............................ 2150676

[52] U.S. Cl.............................. 184/6.12, 184/11 A
[51] Int. Cl............................................. F16n 7/26
[58] Field of Search.... 184/11 R, 11 A, 13 R, 13 A, 184/6.12; 74/467, 468, 710

[56]  References Cited
UNITED STATES PATENTS

| | | | |
|---|---|---|---|
| 1,290,626 | 1/1919 | Masury............................. | 184/13 R |
| 2,018,188 | 10/1935 | Padgett et al...................... | 184/11 R |
| 2,046,282 | 6/1936 | Wert................................ | 184/11 R |
| 2,147,145 | 2/1939 | Carlson et al...................... | 184/11 R |
| 2,555,003 | 5/1951 | Rhoads............................. | 184/11 R |
| 3,182,527 | 5/1965 | Bryan.............................. | 184/11 R X |

*Primary Examiner*—Manuel A. Antonakas
*Attorney, Agent, or Firm*—Craig & Antonelli

[57]  ABSTRACT

A lubricating system for an axle gear inserted into an axle bracket of a motor vehicle in which the axle bracket includes one or several collecting chambers in the form of pockets for lubricant centrifuged up by the bevel gear while the axle gear housing includes one or several distributor chambers for the lubricant; lubricant connections are provided both between a distributor chamber and a collecting chamber as also between a distributor chamber and at least one lubricating place of the differential gear housing such as the teeth of differential bevel gears and a conical roller bearing or bearings of the differential gear housing.

51 Claims, 1 Drawing Figure

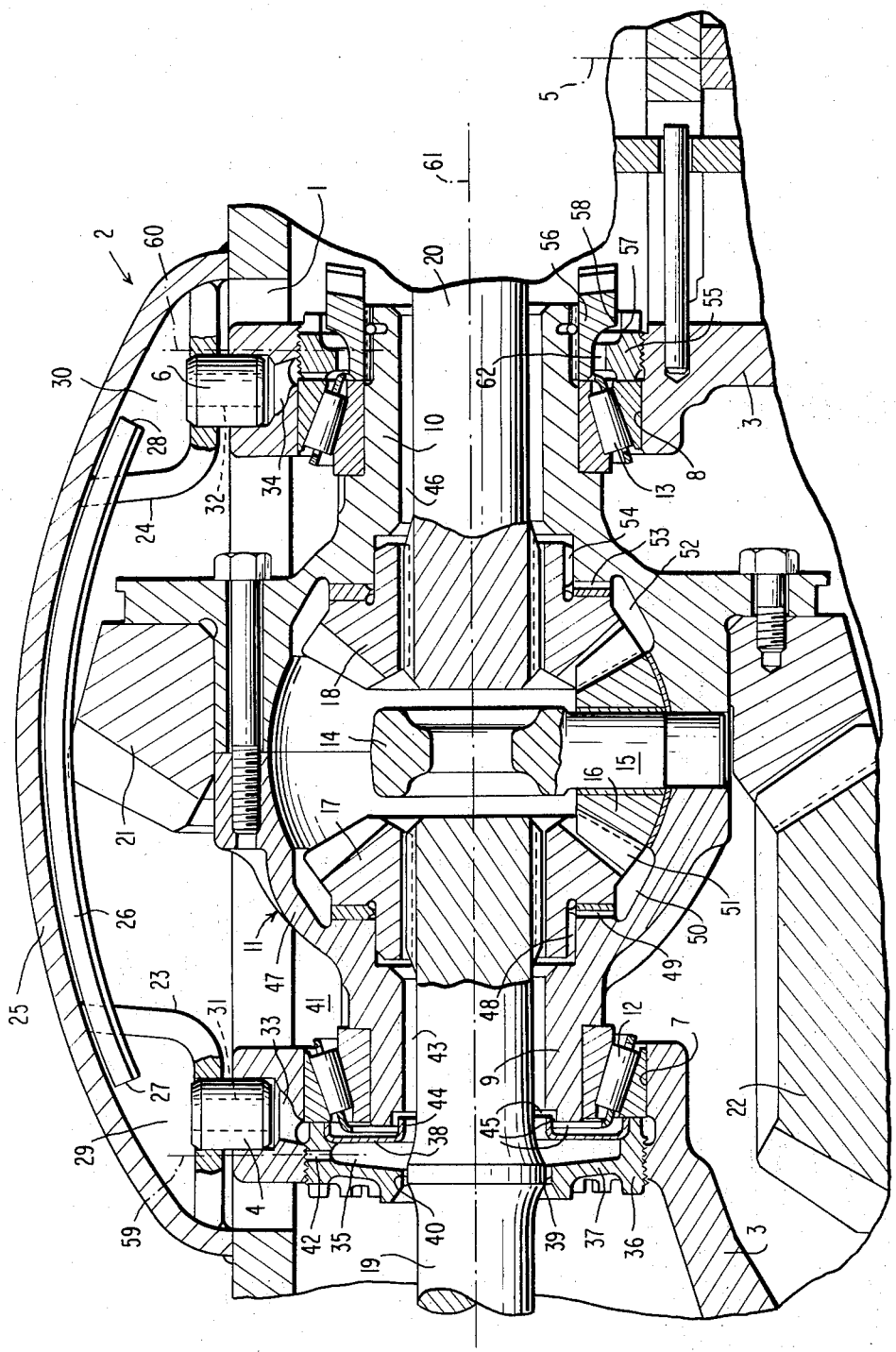

LUBRICATING SYSTEM FOR AXLE GEAR

The present invention relates to a lubricating system for an axle gear inserted into the axle bracket or axle bridge of a motor vehicle. The aim underlying the present invention essentially consists in attaining a safe feed of the lubricant to the lubricating places of the axle gear. For that purpose, it is proposed according to the present invention that the axle bracket includes one or several collecting chambers for the lubricant thrown up by the axle drive bevel wheel and the axle gear housing includes one or several distributor chambers for lubricant, and in that lubricant connections are formed between a distributor chamber and a collecting chamber as also between a distributor chamber and at least one lubricating place of the differential gear housing. In the arrangement according to the present invention, the centrifuging effect of the axle drive bevel wheel is utilized in order to transfer lubricant to a higher level in the axle bracket with respect to the sump so that it can flow to the lubricating places.

In order to facilitate the collection of lubricant, provision is made according to a further feature of the lubricating system of the present invention that a guide and conduction means is arranged in the interior space of the axle bracket which catches lubricant centrifuged up by the axle drive bevel gear and conducts the same into the collecting chambers.

In order to connect the three main areas of lubricating places of the axle gear, namely, the interior space of the differential gear housing and the two bearings at the bearing necks of the differential gear housing, with the collecting chambers by simple means, according to a further feature of the lubricating system according to the present invention, the arrangement is made in such a manner that one distributor-annular chamber each is arranged within the area of the ends of the two bearing necks of the differential gear housing, of which one distributor-annular chamber is in communication with the interior space of the differential gear housing and the other with the bearing of its associated bearing neck, and in that a branch channel is branched off from the distributor chamber in communication with the interior space of the differential gear housing, which branch channel leads to the bearing of the bearing neck adjacent the distributor chamber.

In order to obtain short line paths for the lubricant, and to keep low the structural expenditures for the lubricant conduction, it is appropriate that at least one collecting chamber is connected with a distributor chamber by a connecting channel in the centering bolt for centering the axle gear housing within the axle bracket.

According to a further inventive concept of the present invention, provision is made to construct the securing and fastening place of the centering bolt as collecting chamber. To that end, it is proposed according to the present invention that at least one centering bolt provided with a connecting channel extends through the wall of a pocket which is securely seated at and fastened to the axle bracket and is constructed for the collection of lubricant.

A structurally simple and advantageous embodiment of the conduction and guide means is attained according to a further feature of the present invention in that the axle bracket is provided with a transversely extending collecting channel which at least at one end terminates in a pocket.

The lubricant connections between collecting chamber and distributor chamber can be constructed in a simple manner and of relatively short length if in an advantageous construction of the lubricating system according to the present invention the arrangement is made in such a manner that a collecting chamber and a distributor chamber are disposed at least approximately in the same plane perpendicular to the transmission axis.

If the distributor chambers are disposed at the ends of the two bearing necks, it is advantageous for purposes of saving separate structural means, if at least one distributor chamber is constructed by the use of a bearing-adjusting threaded-ring or nut of the bearing of the differential gear housing.

A problem underlies a further inventive concept, independent as such, which occurs in particular at high rotational speeds. With so-called external planetary axles of commercial types of vehicles, planetary speed-reduction gears are interconnected in effect between the differential gear and the vehicle wheels so that the rotational speed of the differential gear housing is about three to four times higher than in normal axle gears. If one of the vehicle wheels spins through, then extremely high rotational speeds occur at the differential bevel gears. Under these circumstances, under the centrifugal force effect the oil escapes completely out of the differential gear housing provided customarily with wall openings so that the tooth and gear lubrication in the differential gear housing is interrupted, and the bevel gears are destroyed. In order to eliminate this disadvantage, provision is made according to a second proposal of this invention that the differential gear housing forms a closed container with respect to the lubricant, and that one bearing neck of the differential gear housing includes an inlet channel for the lubricant which connects a lubricating chamber disposed outside of the differential gear housing with the interior space of the differential gear housing, and that the other bearing neck of the differential gear housing is provided with an outlet channel which connects the interior space of the differential gear housing with the interior space of the axle bracket. As a result thereof, the differential gear housing remains forcibly filled with oil under all circumstances. The oil filling is continuously replenished little by little by way of the inlet and outlet channel so that also the heat removal is improved. With the application of the lubricating system which is further improved according to the last-mentioned proposal, to a lubricating system according to the first-mentioned proposal of this invention, the inlet channel of the one bearing neck of the differential gear housing may be in communication with a distributor chamber or with a collecting chamber for the lubricant.

In order to attain a safe lubrication of the bevel gear teeth, provision may additionally be made that the differential gear housing includes an inlet chamber for lubricant which is open in the direction toward the teeth of the differential bevel gear and is in communication with the inlet channel.

For the discharge of the lubricant heated up at the bevel gear teeth, it is additionally proposed that the differential gear housing includes a discharge or outlet chamber which is open toward the teeth of the differential bevel gear and is in communication with the discharge or outlet channel.

In order to facilitate the lubricant flow in the differential gear housing and to favor the same by the action of the centrifugal force, the arrangement may be made in such a manner according to the present invention that intermediate channels are provided extending between the differential gear housing wall and one drive shaft bevel gear which connect the inlet channel with the inlet chamber.

In order to obtain identical channel constructions at both axle shaft bevel gears, it is advantageous if intermediate channels are provided extending between the differential gear housing wall and the other drive shaft bevel gear which connect the outlet channel with the discharge chamber.

A structurally simple type of construction of the inlet channel of the one bearing neck is obtained in that an axial annular channel is formed between one driving half-shaft and the bearing neck of the differential gear housing surrounding the same, which annular channel is sealed off by corresponding sealing means between the driving half-shaft and the fixed housing parts with respect to the interior space of the axle bracket.

Accordingly, it is an object of the present invention to provide a lubricating system for an axle gear inserted into the axle bracket of a motor vehicle which avoids by simple means the aforementioned shortcomings and drawbacks encountered in the prior art.

Another object of the present invention resides in a lubricating system for an axle gear of a motor vehicle which assures a sufficient supply of the lubricant to the lubricating places of the axle gear under all operating conditions.

A further object of the present invention resides in a lubricating system for an axle gear constructed as differential gear for a motor vehicle which utilizes the centrifuging effect of the differential bevel wheel to raise the lubricant to a higher level in order to facilitate the flow by gravity to the lubricating places.

Still another object of the present invention resides in a lubricating system of the aforementioned type which facilitates the collection of lubricant for further distribution, assures relatively short line paths for the lubricant and results in a structurally simple and advantageous embodiment which can be readily manufactured and assembled by simple means.

Another object of the present invention resides in a lubricating system for an axle gear inserted into the axle bracket of a motor vehicle which results in considerable savings as regards cost of parts.

A further object of the present invention resides in a lubricating system for axle gears of motor vehicles constructed as differential gears which assure adequate lubrication of the differential bevel gears even when one of the driven wheels spins.

Still a further object of the present invention resides in a lubricating system for a differential axle gear which is simple in construction, involves relatively few additional parts, can be manufactured by simple means, and improves the heat removal from thermally stressed parts.

These and further objects, features and advantages of the present invention will become more apparent from the following description when taken in connection with the accompanying drawing which shows, for purposes of illustration only, one embodiment in accordance with the present invention, and wherein:

The single FIGURE is a partial cross-sectional view through the rear axle of a commercial type motor vehicle showing the features of the present invention.

Referring now to the single FIGURE of the drawing, the axle gear housing 3 is inserted into the central opening 1 of the axle bracket or axle bridge generally designated by reference numeral 2; the axle gear housing 3 is thereby fixed in its installed position by means of centering bolts 4 and 6 fast in the housing and is threadably secured by conventional means at the axle bracket 2—inter alia, at the location schematically indicated by reference numeral 5. The axle gear housing 3 is provided with two coaxial bearing apertures 7 and 8 in which is supported one bearing neck 9 and 10 each of the differential gear housing generally designated by reference numeral 11 by means of conical roller bearings 12 and 13.

A satellite carrier 14 is seated fast in the differential gear housing 11, on the bearing pins 15 of which are seated the differential bevel gears 16. The latter mesh with two axle-shaft bevel-gears 17 and 18 which are nonrotatably mounted on a respective axle half-shaft 19 and 20 for rotation in unison therewith. The differential gear housing 11 is non-rotatably connected with a ring-shaped bevel gear 21 which meshes with a drive pinion 22.

The centering bolts 4 and 6 are each inserted into a rigid stationary pocket 23 and 24, respectively, open only toward the top, which are securely arranged at the housing cover 25 of the axle bracket 2 closing the housing opening 1 toward the rear. Furthermore, a transversely extending collecting channel or trough 26 arranged above the pockets 23 and 24 for lubricant is secured at the housing cover 25, whose laterally open ends 27 and 28 are disposed respectively above a pocket 23 and 24. The lubricant spaces 29 and 30 of the pockets 23 and 24 are in communication by way of a respective bolt channel 31 and 32 and a respective adjoining housing channel 33 and 34 of the axle gear housing 3 with a corresponding distributor ring chamber 35 and 63 for lubricant. The annular distributor chamber 35 is disposed on the inside of a dish- or cup-shaped adjusting nut 36 for the conical roller bearing 12 and is delimited on one side by the bottom 37 of the adjusting ring 36 and on the other, by a sheet metal ring 38 pressed into the latter. The annular distributor chamber 35 is sealed off against the interior space 41 of the axle bracket 2 by means of cooperating sealing surfaces 39 and 40 of the adjusting nut 36 and of the axle half-shaft 19 and is in communication with the housing channel 33 by way of a radial bore 42 provided in the adjusting nut 36. An annular channel 43 is left open between the bearing neck 9 and the axle half-shaft 19, which is in communication with the distributor chamber 35 by way of the central annular aperture 44 of the sheet metal ring 38. A gap channel 45 is left open between the sheet metal ring 38 and the bearing neck 9 which at its radially inner end is in communication with the distributor chamber 35 and radially outwardly terminates toward the bearing or running surfaces of the conical roller bearing 12. The annular channel 43 forms the inlet channel of the differential gear housing 11 which, as to the rest, represents a completely oil-tight housing except for an annular channel 46 between the bearing neck 10 and the axle half-shaft 20 forming the outlet or discharge channel.

Gap channels 48 and 49 in communication with one another are left open between the housing wall 47 of the differential gear housing 11 and the axle shaft bevel gear 17, by means of which the annular channel 43 is connected to an inlet chamber 50 which is open with respect to the teeth 51 of the differential bevels gears 16. On the side of the satellite carrier 14 opposite the annular inlet chamber 50, an annular outlet chamber 52 open also toward the teeth 51 is provided which is in communication with the annular channel 46 by way of gap channels 53 and 54—which are left open between the housing wall 47 and the gear 18 and merge one into the other. The annular channel 46 terminates at its outer end in the interior space 41 of the axle bracket 2.

The distributor ring chamber 62 is open toward the side of the conical roller bearing 13 and is delimited on the remaining three sides by the two threaded adjusting rings or nuts 55 and 56 which are equipped with corresponding sealing edges 55 and 58 for sealing the annular chamber 62 against the interior space 41.

The lubricant collecting in the pocket 23 flows by way of the bolt channel 31 and the housing channel 33 through the bore 42 into the distributor chamber 35. From there, the lubricant flow splits up. The larger portion flows by way of the annular channel 43 and the gap channels 48 and 49 to the teeth 51 whereas a smaller portion is conducted by way of the gap channel 45 to the conical roller bearing 12. After lubrication of the teeth 51, the lubricant collects in the discharge or outlet chamber 52 and flows off from the latter through the gap channels 53 and 54 by way of the annular channel 46 into the sump of the interior space 41.

The lubricant from the pocket 24 serves exclusively for the lubrication of the second conical roller bearing 13. The lubricant thereby flows through the bolt channel 32 and subsequently by way of the housing channel 34 into the distributor chamber 62 from where the bearing is lubricated directly.

In order to obtain short lines for the lubricant supply of the bearings 12 and 13 of the differential gear housing 11, the pockets 23 and 24 with their associated distributor ring chambers 35 and 62 are disposed at least approximately in a respective common plane indicated at 59 and 60, respectively, which is each perpendicular to the transmission axis 61 and is located in direct proximity of the adjacent conical roller bearing 12 and 13, respectively.

While I have shown and described only one embodiment of the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A lubricating system for a motor vehicle having an axle gear, an axle gear housing means, and a differential gear housing means disposed in an axle bracket means with a split shaft received in a respective side of the differential gear housing means, the system comprising: at least one bevel gear operatively connected with the differential gear housing means, at least one collecting chamber means disposed in said axle bracket means for collecting lubricant thrown up by said bevel gear, means for sealing one side of the differential gear housing means from the interior space of the axle bracket means, said last mentioned means including at least one distributor chamber means for distributing lubricant, a first connection means for connecting a distributor chamber means with a collecting chamber means, a second connection means for connecting a distributor chamber means with at least one lubricating place of the differential gear housing means.

2. A lubricating system according to claim 1, wherein several collecting chamber means are disposed in the interior space of said axle bracket means.

3. A lubricating system according to claim 2, wherein several distributor chamber means are provided.

4. A lubricating system according to claim 3, wherein cone roller bearing means are provided for rotatably supporting the differential gear housing means on the axle gear housing means, the differential gear housing means including differential bevel gear means disposed therein operatively connected with the split shafts, and wherein said lubricating places of the differential gear housing means are within the area of the teeth of said differential bevel gear means and said cone roller bearing means.

5. A lubricating system according to claim 1, wherein a conduction means is arranged in the interior space of the axle bracket means for catching and collecting lubricant thrown up by said at least one bevel gear and conducting the same into said collecting chamber means.

6. A lubricating system according to claim 1, wherein the differential gear housing means includes a pair of bearing neck means, a distributor chamber means being arranged within the area of each of the ends of said two bearing neck means, one of said distributor chamber means being in communication with the interior space of the differential gear housing means and the other with the bearing means of its associated bearing neck means, a branch channel means is branched off from the distributor chamber means in communication with the interior space of the differential gear housing means, said branch channel means leading to the bearing means of the bearing neck means adjacent the last-mentioned distributor chamber means.

7. A lubricating system according to claim 6, wherein one distributor chamber means is in communication with an inlet chamber of the axle gear housing means, and wherein said branch channel means is in the form of a gap channel.

8. A lubricating system according to claim 1, wherein centering bolt means are provided for centering the axle gear housing means in the axle bracket means, said at least one collecting chamber means being operatively connected with a distributor chamber means by way of a connecting channel provided in said centering bolt means.

9. A lubricating system according to claim 1, wherein said collecting chamber means are constituted by pocket means formed in the axle bracket means.

10. A lubricating system according to claim 9, wherein at least one centering bolt means is provided with a connecting channel extending through the wall of a corresponding pocket means, said centering bolt means being securely seated at the axle bracket means and constructed for collecting lubricant.

11. A lubricating system according to claim 10, wherein an axle housing cover forming part of the axle bracket means is provided, each of said pocket means being securely fastened to said axle housing cover.

12. A lubricating system according to claim 9, wherein the axle bracket means is provided with a transversely extending collecting channel which terminates at least at one end in a pocket means.

13. A lubricating system according to claim 12, wherein an axle housing cover is provided and said collecting channel is provided in said housing cover.

14. A lubricating system according to claim 1, wherein a respective collecting chamber and distributor chamber means are disposed at least approximately in the same plane perpendicular to the transmission axis.

15. A lubricating system according to claim 1, wherein said sealing means includes an adjusting nut of the differential gear housing means, said at least one distributor chamber means being disposed in said adjusting nut.

16. A lubricating system according to claim 15, wherein conical roller bearing means are provided for supporting the differential gear housing means, said bearing adjusting nut adjusts said conical roller bearing means.

17. A lubricating system according to claim 1, wherein the differential gear housing means forms a closed container with respect to the lubricant, and a pair of bearing neck means are provided on the differential gear housing means, one of said bearing neck means being provided with an inlet channel means for lubricant which connects a lubricant chamber means disposed outside the differential gear housing means with the interior space of the differential gear housing means, the other of said bearing neck means being provided with an outlet channel means which connects the interior space of the differential gear housing means with the interior space of the axle bracket means.

18. A lubricating system according to claim 17, wherein the differential gear housing means includes differential bevel gear means disposed therein operatively connected with the split shafts, and wherein the differential gear housing means includes an inlet chamber for lubricant which is open in the direction of the teeth of said differential bevel gear means and is in communication with said inlet channel means.

19. A lubricating system according to claim 18, wherein the differential gear housing means is provided with an outlet chamber which is open toward the teeth of said differential bevel gear means and in communication with said outlet channel means.

20. A lubricating system according to claim 19, wherein intermediate channel means are provided which extend between a differential gear housing means wall and a corresponding split shaft differential bevel gear means, said intermediate channel means connecting said inlet channel means with said inlet chamber.

21. A lubricating system according to claim 20, wherein additional intermediate channel means are provided which extend between a differential gear housing means wall and the other split shaft differential bevel gear means, said last-mentioned intermediate channel means connecting the outlet channel means with said outlet chamber.

22. A lubricating system according to claim 21, wherein each of said split shafts are surrounded by a respective bearing neck means, and wherein an axial annular channel is formed between a split shaft and the bearing neck means surrounding the same, said sealing means sealing off at least one of said axial annular channels with respect to the interior space of the axle bracket means.

23. A lubricating system according to claim 22, wherein an adjusting nut is provided for the differential gear housing means, said sealing means being constituted by sealing surfaces on the split shaft and said adjusting nut of the bearing means.

24. A lubricating system according to claim 17, wherein the differential gear housing means includes differential bevel gear means disposed therein operatively connected with the split shafts, and wherein the differential gear housing means is provided with an outlet chamber which is open toward the teeth of said differential bevel gear means and in communication with the outlet channel means.

25. A lubricating system according to claim 17, wherein the differential gear housing means includes differential bevel gear means disposed therein operatively connected with the split shafts, and wherein intermediate channel means are provided which extend between a differential gear housing means wall and a corresponding split shaft differential bevel gear means, said intermediate channel means connecting said inlet channel means with said inlet chamber.

26. A lubricating system according to claim 25, wherein intermediate channel means are provided which extend between a differential gear housing means wall and the other split shaft differential bevel gear means, said last-mentioned intermediate channel means connecting the outlet channel means with an outlet chamber.

27. A lubricating system according to claim 17, wherein each of said split shafts are surrounded by a respective bearing neck means, and wherein an axial annular channel is formed between a split shaft and the bearing neck means surrounding the same, said sealing means sealing off at least one of said axial annular channels with respect to the interior space of the axle bracket means.

28. A lubricating system according to claim 27, wherein an adjusting nut is provided for said differential gear housing means, said sealing means being constituted by sealing surfaces on the split shaft and said adjusting nut.

29. A lubricating system according to claim 1, wherein the differential gear housing means is provided with a pair of bearing neck means, one bearing neck means of the differential gear housing being provided with an inlet channel in the form of a ring connecting a distributor chamber means in the form of an annular chamber disposed on the outside of the differential gear housing means with an inlet chamber of the differential gear housing means, the other of said bearing neck means being provided with an outlet channel in the form of an annular channel which connects an outlet chamber of the differential gear housing means with the interior space of the axle bracket means.

30. A lubricating system for an axle gear inserted into an axle bracket means of a motor vehicle, characterized in that the axle bracket means includes at least one collecting chamber means for lubricant thrown up by a bevel gear, the axle gear including an axle gear housing means having at least one distributor chamber means for lubricant, and lubricant connection means between a distributor chamber means with a collecting chamber means as also between a distributor chamber means with at least one lubricating place of the differential gear housing means, a conduction means is arranged in the interior space of the axle bracket means which catches and collects lubricant thrown up by a drive bevel gear and conducts the same into the collecting chamber means, and characterized in that the differential gear housing means includes bearing neck means, a distributor ring chamber means being arranged within the area of each of the ends of the two bearing neck means, of which one distributor ring chamber means is in communication with the interior space of the differential gear housing means and the other with the bearing means of its associated bearing neck means, and in that a branch channel means is branched off from the distributor chamber means in communication with the interior space of the differential gear housing means which leads to the bearing means of the bearing neck means adjacent the last-mentioned distributor chamber means.

31. A lubricating system according to claim 30, characterized in that the one distributor ring chamber means is in communication with an inlet chamber of the axle gear housing means and that the branch channel means is in the form of a gap channel.

32. A lubricating system according to claim 31, characterized in that the bearing means are conical roller bearings.

33. A lubricating system according to claim 30, characterized in that at least one collecting chamber means is operatively connected with a distributor chamber means by way of a connecting channel provided in a centering bolt means for centering the axle gear housing means in the axle bracket means.

34. A lubricating system according to claim 33, characterized in that the collecting chamber means are constituted by pocket means formed in the axle bracket means.

35. A lubricating system according to claim 34, characterized in that at least one centering bolt means provided with a connecting channel extends through the wall of a corresponding pocket means which is securely seated at the axle bracket means and is constructed for collecting lubricant.

36. A lubricating system according to claim 35, characterized in that each pocket means is securely fastened to an axle housing cover forming part of the axle bracket means.

37. A lubricating system according to claim 35, characterized in that the axle bracket means is provided with a transversely extending collecting channel which terminates at least at one end in a pocket means and forms a part of the conduction means.

38. A lubricating system according to claim 37, characterized in that each pocket means is securely fastened to an axle housing cover forming part of the axle bracket means.

39. A lubricating system according to claim 38, characterized in that the collecting channel is provided in the axle housing cover.

40. A lubricating system according to claim 37, characterized in that a respective collecting chamber and distributor chamber means are disposed at least approximately in the same plane perpendicular to the transmission axis.

41. A lubricating system according to claim 40, characterized in that at least one distributor chamber means is constituted by means of an adjusting nut of the bearing means of the differential gear housing means.

42. A lubricating system according to claim 41, characterized in that the bearing adjusting nut adjusts the conical roller bearing means of the axle gear housing means.

43. A lubricating system according to claim 41, characterized in that the differential gear housing means forms a closed container with respect to the lubricant, and in that one bearing neck means of the differential gear housing means is provided with an inlet channel means for lubricant which connects a lubricant chamber means disposed outside the differential gear housing means with the interior space of the differential gear housing means, and in that the other bearing neck means of the differential gear housing means is provided with an outlet channel means which connects the interior space of the differential gear housing means with the interior space of the axle bracket means.

44. A lubricating system according to claim 43, characterized in that the differential gear housing means includes an inlet chamber for lubricant which is open in the direction toward the teeth of the differential bevel gear means and is in communication with the inlet channel means.

45. A lubricating system according to claim 44, characterized in that the differential gear housing means is provided with an outlet chamber which is open toward the teeth of the differential bevel gear means and is in communication with the outlet channel means.

46. A lubricating system according to claim 45, characterized in that intermediate channel means are provided which extend between the differential gear housing wall and a corresponding drive shaft bevel gear means, said intermediate channel means connecting the inlet channel means with the inlet chamber.

47. A lubricating system according to claim 46, characterized in that intermediate channel means are provided which extend between the differential gear housing wall and the other drive shaft bevel gear means, said last-mentioned intermediate channel means connecting the outlet channel means with the outlet chamber.

48. A lubricating system according to claim 47, characterized in that an axial annular channel is formed between a driving half-shaft and the bearing neck means surrounding the same, said axial annular channel being sealed off with respect to the interior space of the axle bracket means by corresponding sealing means between the driving half-shaft and fixed housing parts.

49. A lubricating system according to claim 48, characterized in that the sealing means are constituted by sealing surfaces between the driving half-shaft and the adjusting nut of the bearing means.

50. A lubricating system according to claim 49, characterized in that the axle bracket means has several collecting chamber means.

51. A lubricating system according to claim 50, characterized in that the axle gear housing means has several distributor chamber means.

* * * * *